(12) United States Patent
Tho (10) Patent No.: US 8,801,108 B2
(45) Date of Patent: Aug. 12, 2014

(54) RIM ASSEMBLY WITH PADS AND CONNECTION MEMBERS TO CONNECT SPOKES

(75) Inventor: Kee Ping Tho, Jiangsu (CN)

(73) Assignee: Kunshan Henry Metal Technology Co., Ltd., Jiangsu (CN)

( * ) Notice: Subject to any disclaimer, the term of this patent is extended or adjusted under 35 U.S.C. 154(b) by 71 days.

(21) Appl. No.: 13/103,205

(22) Filed: May 9, 2011

(65) Prior Publication Data

US 2012/0235467 A1 Sep. 20, 2012

(30) Foreign Application Priority Data

Mar. 16, 2011 (TW) .............................. 100204694 U (51) Int. Cl.
*B60B 21/06* (2006.01)
(52) U.S. Cl.
USPC ........................................ 301/58; 301/95.104
(58) Field of Classification Search
USPC ........................................ 301/55, 58, 61, 104
See application file for complete search history.

(56) References Cited

U.S. PATENT DOCUMENTS

| | | | | |
|---|---|---|---|---|
| 6,036,279 A * | 3/2000 | Campagnolo | ................... | 301/55 |
| 6,048,035 A * | 4/2000 | Chen | ................... | 301/30 |
| 6,293,629 B1 * | 9/2001 | Chen | ................... | 301/58 |
| 6,715,844 B2 * | 4/2004 | Dietrich | ................... | 301/58 |
| 2005/0023883 A1 * | 2/2005 | Okajima | ................... | 301/58 |
| 2005/0194834 A1 * | 9/2005 | Chen | ................... | 301/58 |
| 2007/0035175 A1 * | 2/2007 | Lin | ................... | 301/55 |
| 2009/0322145 A1 * | 12/2009 | Rinard | ................... | 301/58 |
| 2010/0264722 A1 * | 10/2010 | Teixeira | ................... | 301/58 |

* cited by examiner

*Primary Examiner* — S. Joseph Morano
*Assistant Examiner* — Jean Charleston
(74) *Attorney, Agent, or Firm* — Rosenberg, Klein & Lee (57) ABSTRACT

A rim assembly includes a rim having a first connection bridge and a second connection bridge, and two walls extend from two sides of the first and second connection bridges. The first and second connection bridges each have multiple installation holes. A pad unit includes multiple pads and each pad has a through hole. The pads are located on a surface of the first connection bridge and the through holes are in alignment with the installation holes. Multiple connection members each have a passage, the connection members respectively extend through the installation holes and the through holes. The spokes are securely connected to the passages. The thickness of the rim is thin and the pads reinforce the connection positions where the spokes are connected.

9 Claims, 9 Drawing Sheets

Fig. 10

RIM ASSEMBLY WITH PADS AND CONNECTION MEMBERS TO CONNECT SPOKES

FIELD OF THE INVENTION

The present invention relates to a rim assembly, and more particularly, to a rim with pads and connection members, and the spokes are connected to the rim and the connection members.

BACKGROUND OF THE INVENTION

A conventional wheel generally includes a rim, a hub located at the center of the rim and the spokes connected between the rim and the hub. The rim is made by Aluminum Alloy and extruded to a straight strip which is cut and the two ends are connected to each other to form a circular rim. The rim includes a top connection bridge and a bottom connection bridge and two walls extend from two sides of the two connection bridges. The tire is engage to the walls and multiple installation holes are defined through the two connection bridges so as to be connected with the spokes.

The manufacturers try to reduce the weight of the rim by reducing the material for making the rim while the structural strength and the static and kinetic statuses are remained the same.

The maximum stress is found at the connection zone where the spokes are connected to the rim so that the thickness of the rim in the connection zone is made to be thicker than the rest part of the rim. It is important to increase the strength at the connection zone to bear the stress while the rim is still light.

When the rim is manufactured, the thickness of the rim is milled or cut to have the desired thickness.

Taiwan Utility Patent No. 089213822 discloses a bicycle rim which includes a top connection bridge and a bottom connection bridge and two walls extend from two sides of the two connection bridges. Multiple installation holes are defined through the bottom connection bridge or the walls so as to be connected with the spokes. The thickness of the bottom connection bridge and the one of the two walls that has the installation holes are thicker than the rest parts of the bottom connection bridge and the wall.

Another bicycle rim is disclosed in China Patent No. 200410062041.X which includes a thickness increment or a thickness decrement located between the bottom connection bridge and the adjacent spoke connection area so as to form a sharp angular turn portion which is connected with a connection zone and the radius of the curvature of the connection zone is equal or less than 0.4 mm.

The first example discloses the thicker portion at the bottom connection bridge or the wall that has the installation holes, and the thinner portion at the portion between the spoke connection positions. The different thickness makes the connection bridge or the wall have wave-shaped change. The second example shows that the rim includes a sharp angular turn portion between two spokes connected to the connection bridge or the wall.

However, both of the two examples have to be machined separately so as to machine the rim to have thicker and thinner portions. The machining processes involve the risk that cuts too much or even breaks the rim.

The present invention intends to provide a rim that has pads and connection members and the spokes are connected to the rim by the pads and connection members.

SUMMARY OF THE INVENTION

The present invention relates to a rim assembly and includes a rim having a first connection bridge and a second connection bridge, and two walls extend from two sides of the first and second connection bridges. The first connection bridge is located close to the center of the rim. The first and second connection bridges each have multiple installation holes. A pad unit includes multiple pads and each pad has a through hole. The pads are located on a surface of the first connection bridge and the through holes are in alignment with the installation holes. Multiple connection members each have a passage, the connection members respectively extend through the installation holes and the through holes. The spokes are securely connected to the passages. The thickness of the rim is thin and the pads reinforce the connection positions where the spokes are connected. No extra machining processes are needed.

The primary object of the present invention is to provide a rim assembly where pads are connected to the installation holes of the rim and connection members are cooperated with the pads to increase the structural strength of the positions where the spokes are connected to the rim.

Another object of the present invention is to provide a rim assembly wherein the thickness of the rim is remained the thin thickness and only the positions where the spokes are connected to the rim are reinforced so that the wheel can be assembled at low cost.

Yet another object of the present invention is to provide a rim assembly wherein the connection members can be rivets or composed of two pieces which are threadedly connected to each other. The rim can be assembled conveniently.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 5, the rim assembly of the present invention comprises a rim 10, a pad unit, and a connection member unit.

Figure 1:
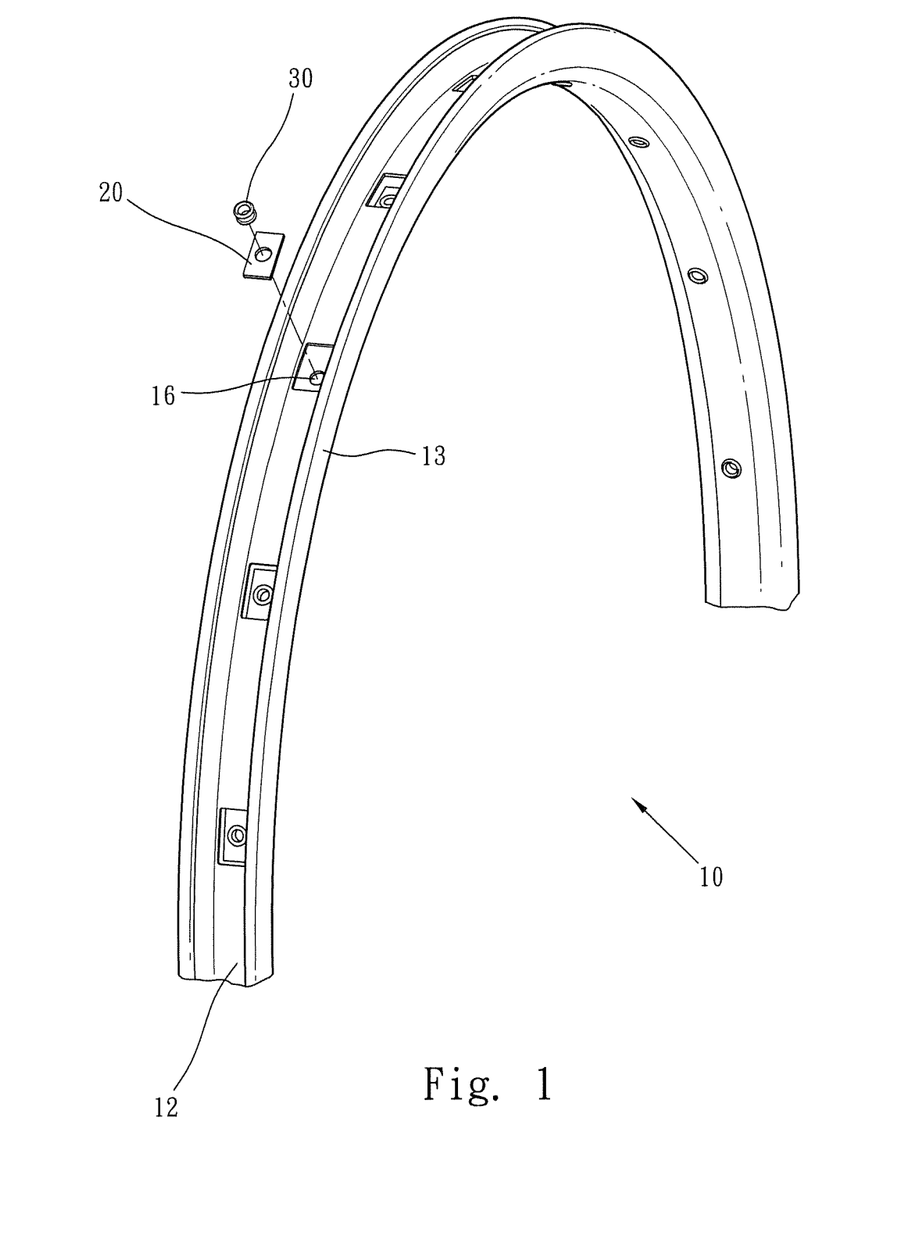
FIG. 1 is a perspective view to show a part of the rim assembly of the present invention.
Figure 2:
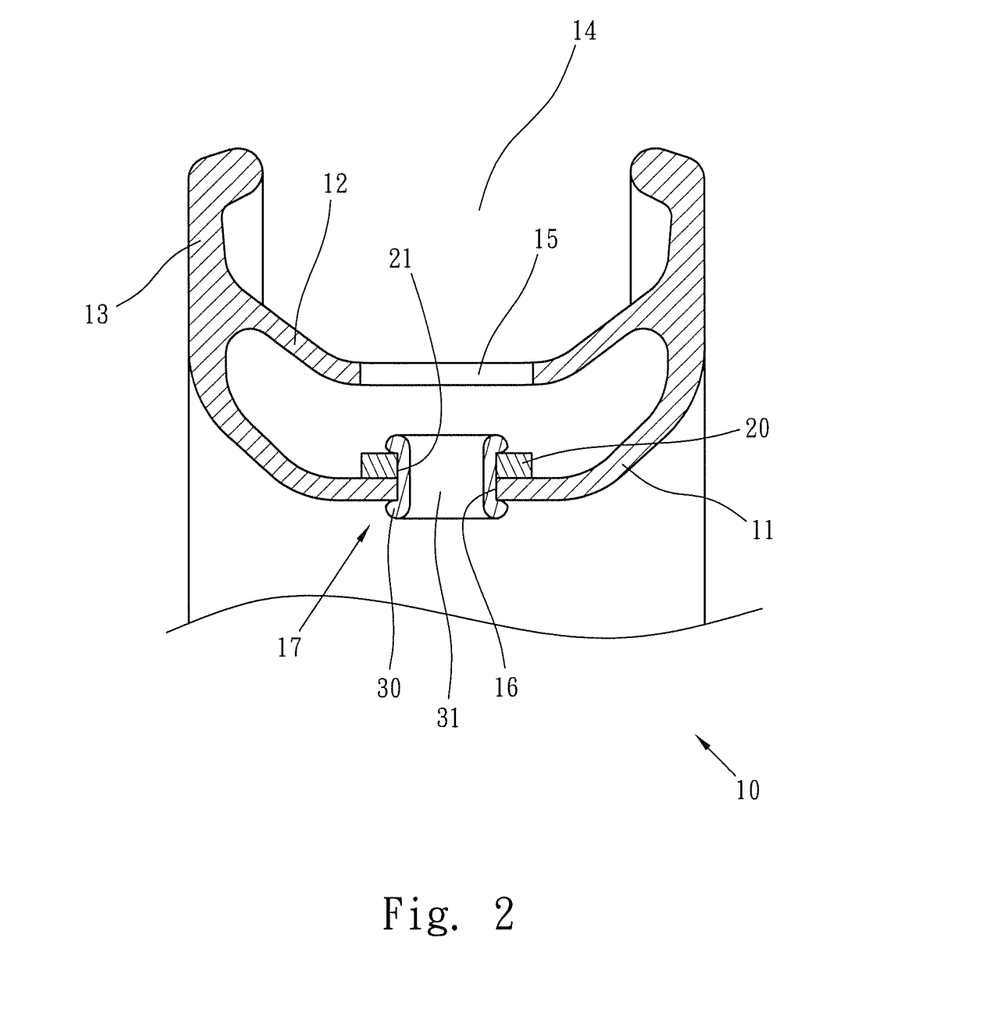
FIG. 2 is an end cross sectional view of the rim assembly of the present invention.
Figure 3:
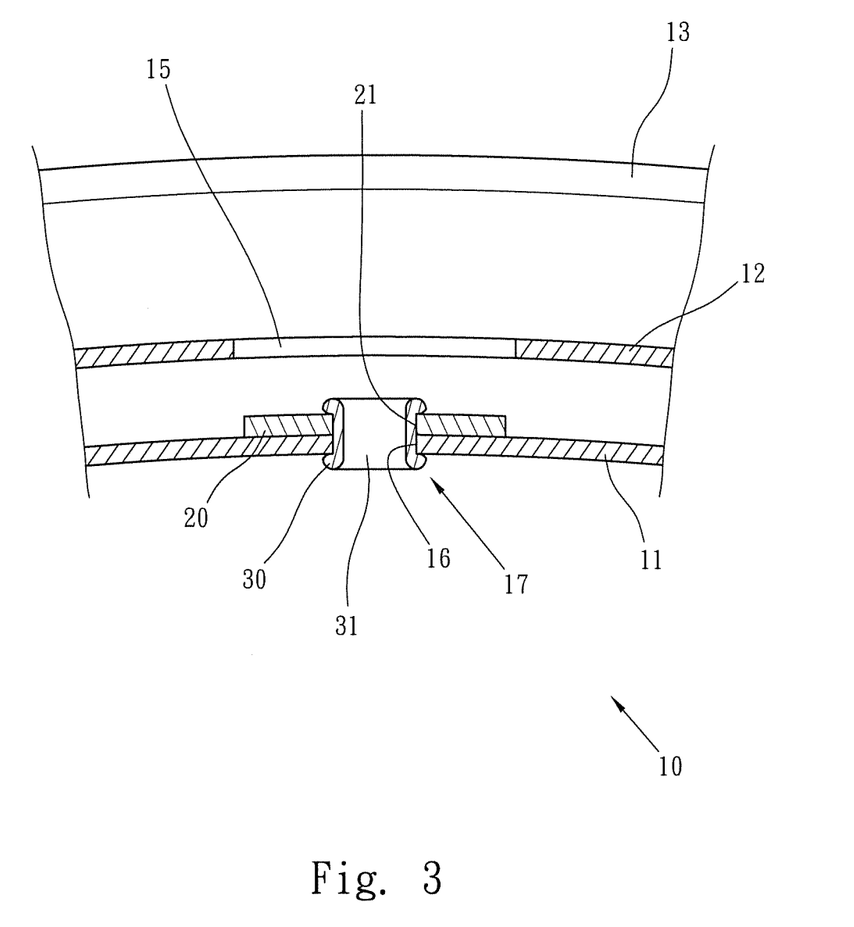
FIG. 3 is a side cross sectional view of the rim assembly of the present invention.

The rim 10 has a first connection bridge 11 and a second connection bridge 12, two walls 13 extending from two sides of the first and second connection bridges 11, 12, wherein the first connection bridge 11 is located close to the center of the rim 10 and the first and second connection bridges 11, 12 share a common center of the rim 10. The rim 10 has an inverted A-shaped end cross sectional view. The walls 13 have lips for connected with the tire (not shown). The first connection bridge 11 has multiple first installation holes 16 and the second connection bridge 12 has multiple second installation holes 15 so as to form a connection zone where heads 41 of spokes 40 are connected to the rim 10. The diameter of the second installation holes 15 is larger than that of the first installation holes 16.

Figure 4:
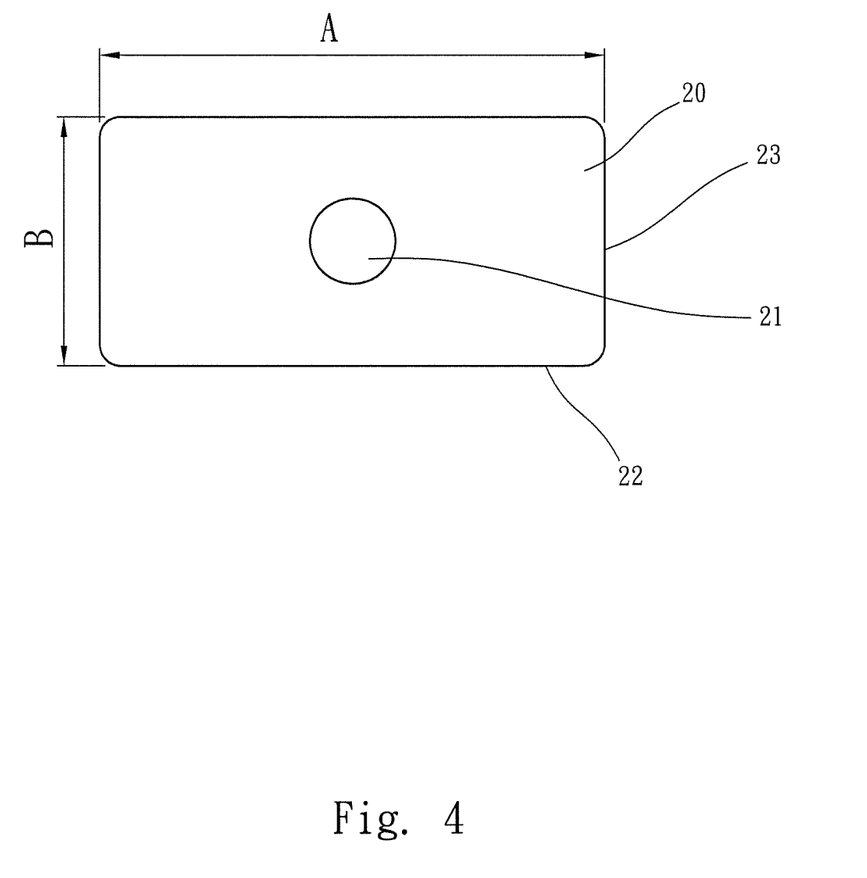
FIG. 4 shows the pad of the rim assembly of the present invention.
Figure 5:
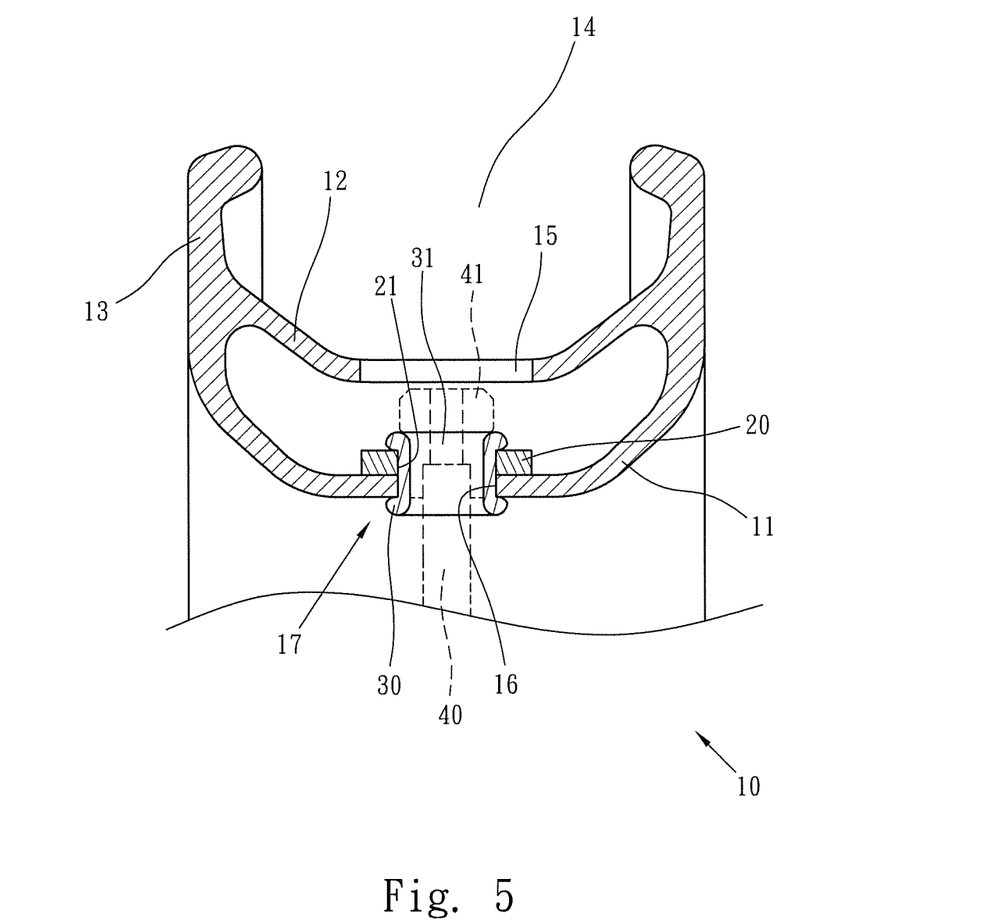
FIG. 5 is an end cross sectional view to show that a spoke is connected to the rim assembly of the present invention.

The pad unit includes multiple pads 20 and each pad 20 has a through hole 21. The pads 20 each are an elongate pad and includes a long side 22 and a short side 23. The length "A" of the long side 22 is longer than the length "B" of the short side 23. The pads 20 are located on a surface of the first connection bridge 11 and the through holes 21 are in alignment with the first installation holes 16. The surface mentioned above faces the second connection bridge 12 as shown in FIGS. 2 and 3. The connection member unit includes multiple connection members 30 and each connection member 30 has a passage 31. The connection members 30 respectively extend through the first installation holes 16 and the through holes 21, and the spokes 40 securely connected to the passages 31. The head 41 of the spoke 40 does not contact the second connection bridge 12 so that the rim 10 is not deformed when significant stress is applied to the spokes 40. In this embodiment, the connection members 30 are rivets to connect the first connection bridge 11 and the pads 20.

The rim 10 can be made to have thin thickness and the pads 20 reinforce the structural strength of the first connection bridge 11. The connection members 30 connect the first connection bridge 11 and the pads 20 to reinforce the strength of the connection zone 17 which does not need any extra machining process.

Figure 6:
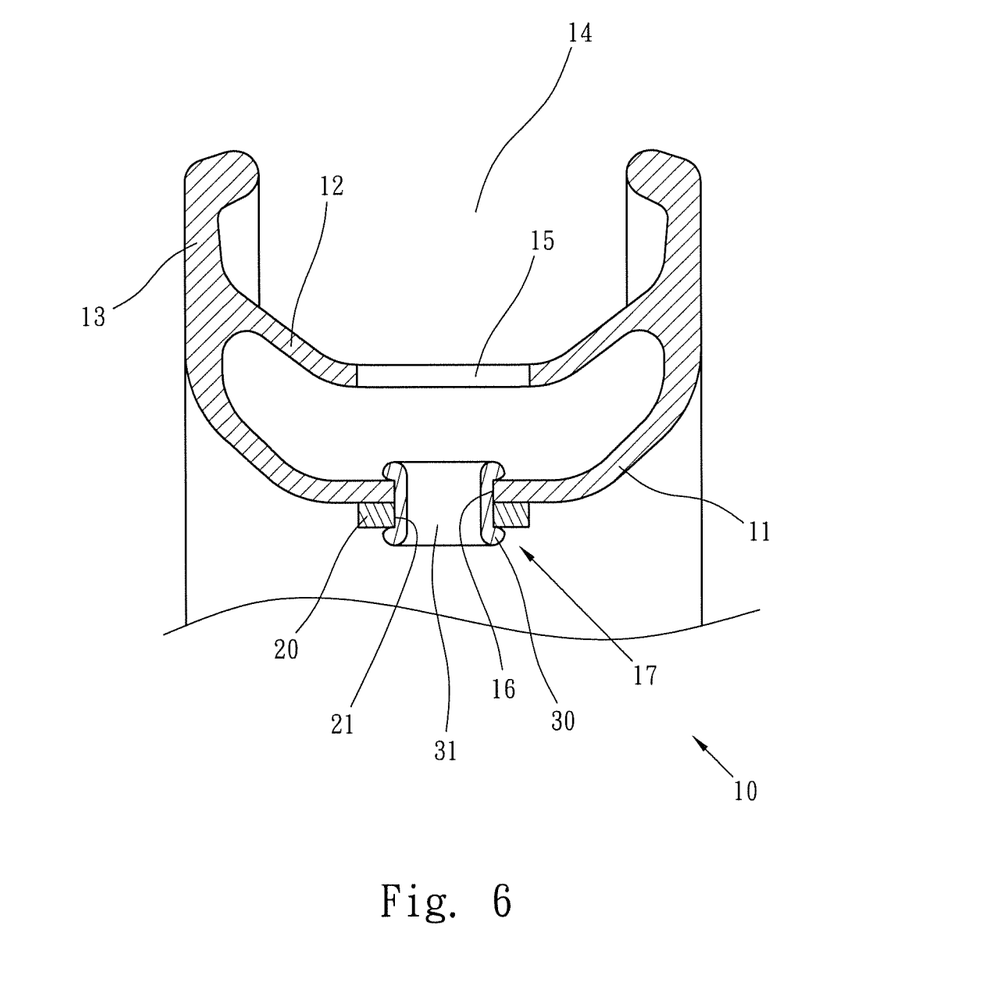
FIG. 6 is an end cross sectional view the second embodiment of the rim assembly of the present invention.

As shown in FIG. 6, the pads 20 can be located on the surface of the first connection bridge 11 and the surface is located opposite to the second connection bridge 12. The connection members 30 connect the first connection bridge 11 and the pads 20 to reinforce the strength of the connection zone 17.

Figure 7:
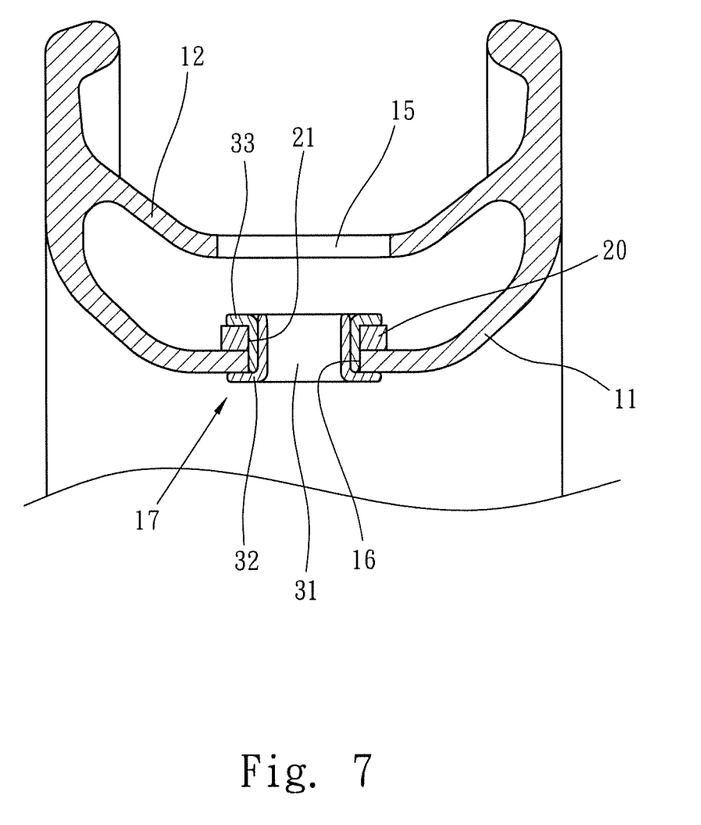
FIG. 7 is an end cross sectional view the third embodiment of the rim assembly of the present invention.

FIG. 7 shows that the connection members 30 each are composed of a first connection piece 32 and a second connection piece 33 which is riveted to the first connection piece 32. The passage 31 is defined through the first and second connection pieces 32, 33.

Figure 8:
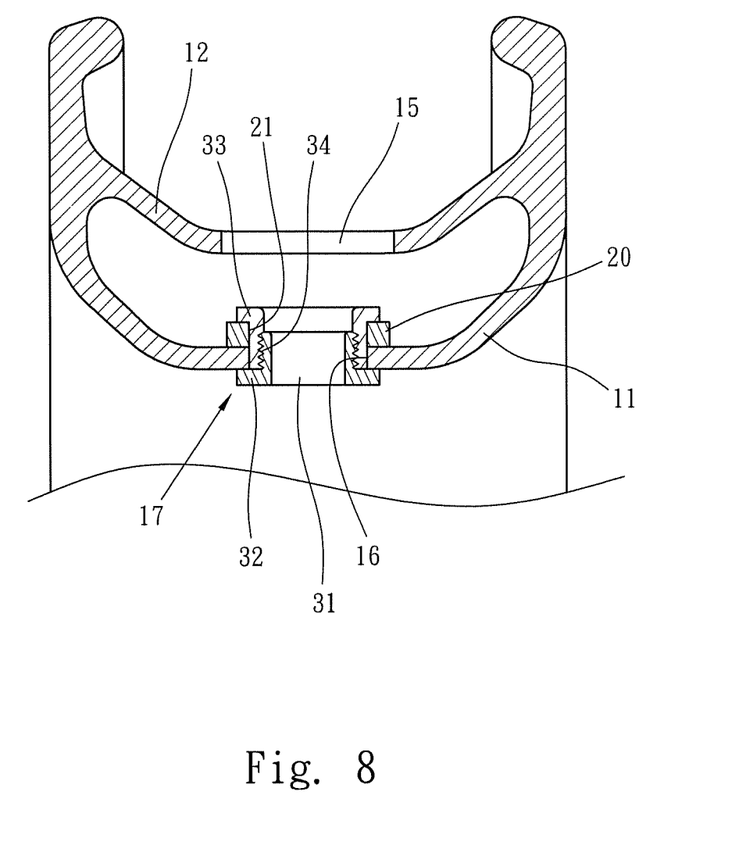
FIG. 8 is an end cross sectional view the fourth embodiment of the rim assembly of the present invention.

FIG. 8 shows that the connection members 30 each are composed of a first connection piece 32 and a second connection piece 33 which is threadedly connected to the first connection piece 32 by their respective threaded portions 34. The passage 31 is defined through the first and second connection pieces 32, 33.

Figure 9:
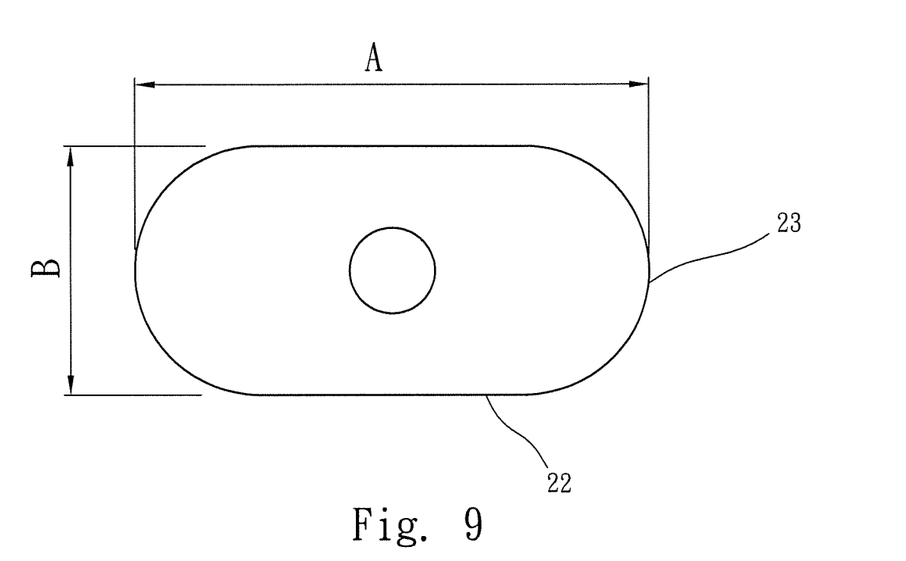
FIG. 9 is an end cross sectional view the fifth embodiment of the rim assembly of the present invention.
Figure 10:
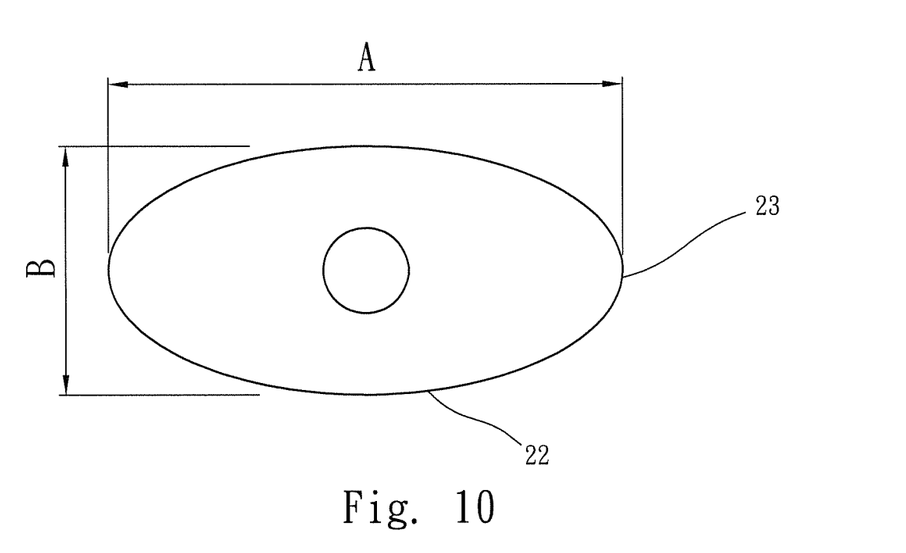
FIG. 10 is an end cross sectional view the sixth embodiment of the rim assembly of the present invention.

FIG. 9 shows that the pads 20 each have two rounded ends which are located at the short sides 23. FIG. 10 shows that the pads 20 each are an oval pad and the long side 22 and the short side 23 are curved sides.

The pads 20 is pout on the first installation holes 16 to increase the thickness of the area around the first installation holes 16 so that when the spokes 40 are connected to the rim 10, the rim 10 is not deformed or broken. Therefore, the thickness of the first connection bridge 11 does not need to be thick so that the weight of the rim 10 is reduced. No extra machining process is needed and the rim 10 is manufactured at lower cost and the production risks are reduced.

The connection members 30 can be rivets or composed of two pieces which are connected to each other by a rivet or by threadedly connection.

The present invention provides the pads 20 located on the surface where the first installation holes 16 are located on the first connection bridge 11 and the pads 20 are cooperated with the connection members 30 to connect the spokes 40, so that the pads 20 increase the thickness and the strength of the rim 10 and the rim can be made to be thin and light in weight.

While we have shown and described the embodiment in accordance with the present invention, it should be clear to those skilled in the art that further embodiments may be made without departing from the scope of the present invention.

What is claimed is:

1. A rim assembly comprising:
a rim having a first connection bridge and a second connection bridge extending annularly about a center of the rim, two walls extending from two sides of the first and second connection bridges, the first connection bridge being disposed radially inward relative to the second connection bridge, the first connection bridge having multiple first installation holes and the second connection bridge having multiple second installation holes, the first connection bridge defining a connection zone about each first installation hole thereof for connection of a head of a spoke to the rim;
a pad unit having multiple pads and each pad having a through hole, the pads located on a surface of the first connection bridge and the through holes being respectively in alignment with the first installation holes; and
multiple connection members and each connection member having a passage, each of the connection members extending through one first installation hole and one through hole of a pad to fasten the pad to the first connection member, the connection member being thereby configured to receive a spoke through the passage thereof.

2. The rim assembly as claimed in claim 1, wherein the pads each are an elongate pad and includes a long side and a short side.

3. The rim assembly as claimed in claim 2, wherein the pads each have two rounded ends.

4. The rim assembly as claimed in claim 2, wherein the pads each are an oval pad and the long and short sides are curved sides.

5. The rim assembly as claimed in claim 1, wherein the pads are located on the surface of the first connection bridge and the surface faces the second connection bridge.

6. The rim assembly as claimed in claim 1, wherein the pads are located on the surface of the first connection bridge and the surface is located opposite to the second connection bridge.

7. The rim assembly as claimed in claim 1, wherein the connection members each are an elongate member which is a rivet.

8. The rim assembly as claimed in claim 1, wherein the connection members each are composed of a first connection piece and a second connection piece which is riveted to the first connection piece, the passage is defined through the first and second connection pieces.

9. The rim assembly as claimed in claim 1, wherein the connection members each are composed of a first connection piece and a second connection piece which is threadedly connected to the first connection piece, the passage is defined through the first and second connection pieces.

* * * * *